Jan. 19, 1954
T. McQUAID
2,666,401
DEVICE TO SHAPE PIECRUST DOUGH
Filed April 11, 1952
3 Sheets-Sheet 2
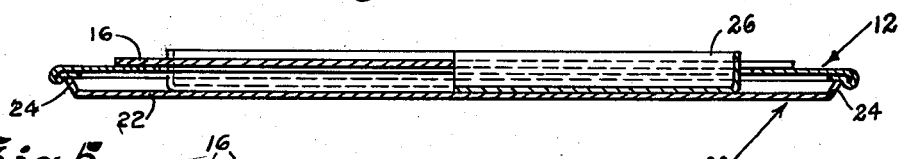
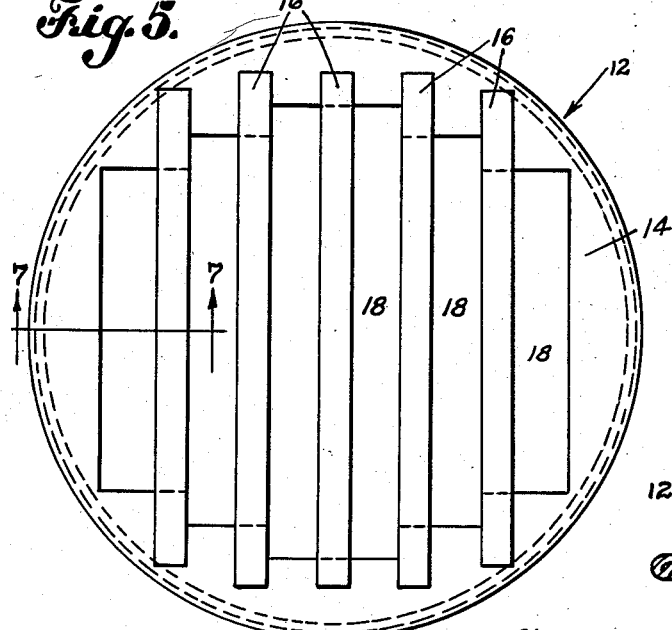
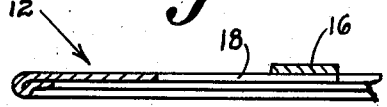
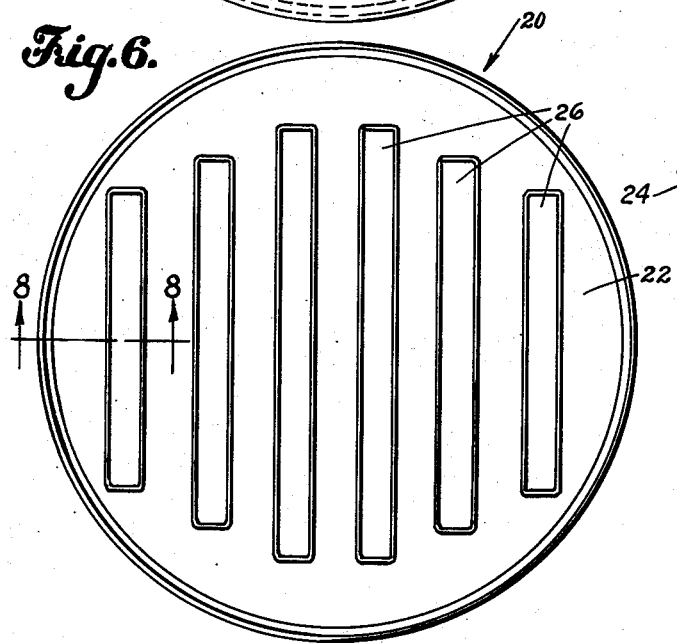
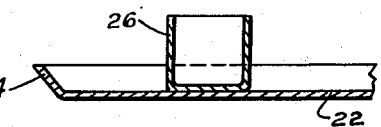
INVENTOR.
Thomas McQuaid
BY Harold E. Cole
Attorney Jan. 19, 1954   T. McQUAID   2,666,401
DEVICE TO SHAPE PIECRUST DOUGH
Filed April 11, 1952   3 Sheets-Sheet 3
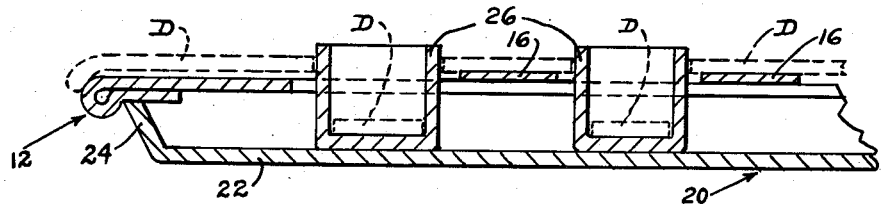
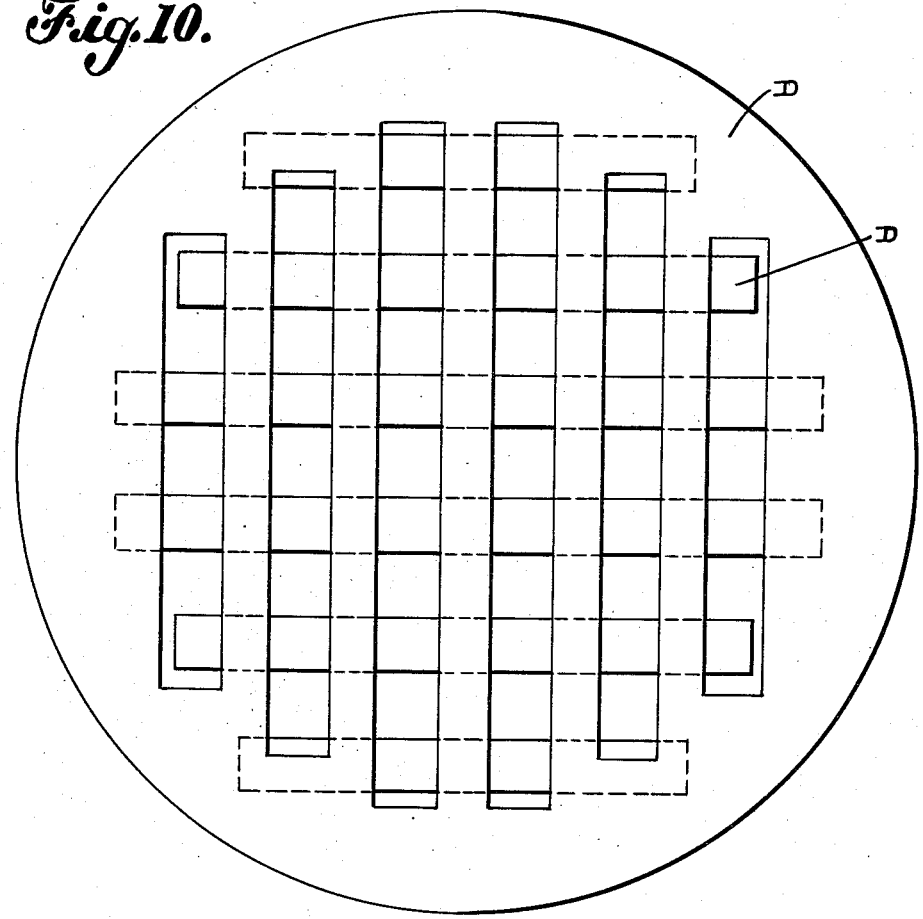
INVENTOR.
Thomas McQuaid
BY Harold E. Cole
Attorney Patented Jan. 19, 1954

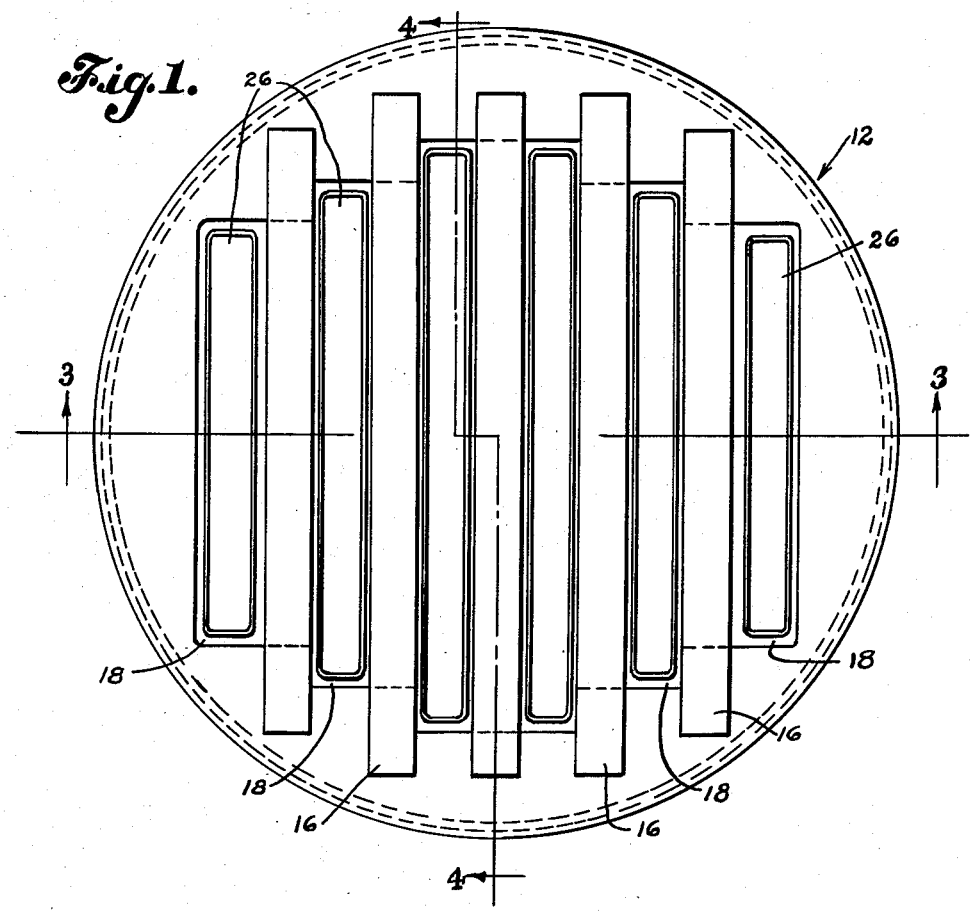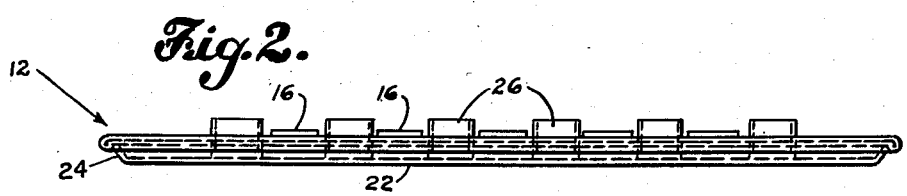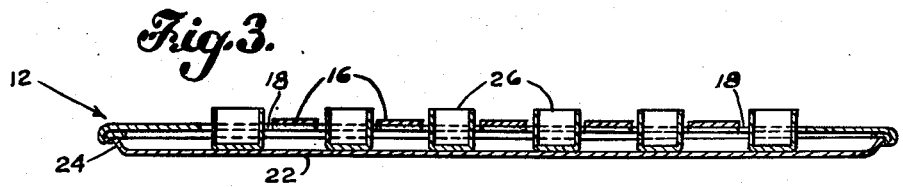

2,666,401

UNITED STATES PATENT OFFICE 2,666,401

DEVICE TO SHAPE PIECRUST DOUGH

Thomas McQuaid, Boston, Mass.

Application April 11, 1952, Serial No. 281,807

2 Claims. (Cl. 107—47)

This invention relates to a device to shape pie crust dough or the like.

One object of my invention is to provide an inexpensive device that is simple to use, which enables the user, in one operation, to form a basic pie crust, or the like and simultaneously form separate, decorative parts therefor that may be placed below or on top of the basic pie crust. The dough used may be yeast dough, pie dough or other baking doughs.

The foregoing and other objects which will appear as the nature of the invention is better understood, may be accomplished by a construction, combination and arrangement of parts such as is disclosed by the drawings. The nature of the invention is such as to render it susceptible to various changes and modifications, and, therefore, I am not to be limited to the construction disclosed by the drawings nor to the particular parts described in the specification; but am entitled to all such changes therefrom as fall within the scope of my claims.

Figure 1 is a top plan view of my device with the parts forming it in assembled position ready to receive pie crust dough or the like. Figure 2 is a side elevational view thereof.

Figure 3 is a sectional view taken on the line 3—3 of Figure 1, and Figure 4 is a sectional view taken on the line 4—4 of Figure 1.

Figure 5 is a top plan view of my lifter platform.

Figure 6 is a top plan view of my base plate.

Figure 7 is an enlarged, sectional view taken on the line 7—7 of Figure 5.

Figure 8 is an enlarged, sectional view taken on the line 8—8 of Figure 6.

Figure 9 is an enlarged, fragmentary, sectional view of my device with the parts forming it assembled, the dash lines showing the position of the dough when pressed into the desired forms.

Figure 10 is a top plan view of a pie crust with separate strips under the basic pie crust.

As illustrated, my device has a lifter platform 12 which is made of sheet metal or other relatively thin material. It has a solid, outside or peripheral portion 14 with relatively long, flat strips 16 extending across an intermediate portion thereof, which are spaced, as at 18, laterally apart.

A base plate 20 is made of flat, sheet material such as metal or plastic, preferably having a solid bottom 22, and upturned edges 24 in position of use. Extending angularly outward from an intermediate portion of said bottom 22, in the same direction as said edges 24, are oblong-shaped dies 26 which are of such size and shape that they extend through said lifter platform spaces 18, there being six such dies 26 and six said spaces 18, as shown. These dies 26 are defined by projecting blades, and their interior may measure, for instance, $\frac{7}{8}$" wide, $6\frac{5}{8}$" long and $\frac{3}{8}$" deep. At any rate, said dies are preferably considerably longer than wide, and sufficiently deep so that said blades extend through said spaces 18 upwardly well beyond said lifter platform 12 as illustrated in Figures 2 and 3 of the drawings.

In practicing my method I place said lifter platform 12 on said base plate 20, with said dies 26 projecting through said spaces 18, and a sheet of dough D is placed on the assembly, resting mainly on said dies 26 because they project above said platform 12. Pressure is applied, as by running a roller across the dough D, forcing part of it onto said platform 12 and part into the interior of said dies 26, thereby cutting the dough into strips S the shape of said dies. Said platform 12 is raised carrying with it the basic pie crust; but leaving the long strips of dough cut out by said dies 26 within the latter's interior. They are removed and may be placed on the pie filling before said basic pie crust, or on top of the latter after it is placed on the pie filling.

What I claim is:

1. A dough shaping assembly comprising, in position of use, a lifter platform embodying a solid outside portion and elongate strips extending across an intermediate portion of said platform spaced laterally apart and having a plurality of elongate openings extending therethrough in alternating arrangement with said strips, and a base plate having a solid bottom and an upturned outer edge and elongate dies extending outwardly from an intermediate portion of said bottom and extending through said platform elongate openings, the said platform solid portion resting upon said base plate upturned outer edge and extending beyond thereof to thereby overlie said base plate.

2. A dough shaping assembly comprising, in position of use, a lifter platform embodying a solid outside portion and elongate strips extending across an intermediate portion of said platform spaced laterally apart and having a plurality of elongate openings extending therethrough in alternating arrangement with said strips, and a base plate having a solid bottom and elongate dies extending outwardly from an intermediate portion of said bottom and extending through said platform elongate openings, the said platform solid portion resting upon said base plate solid bottom and extending beyond thereof to thereby overlie said base plate.

THOMAS McQUAID.

References Cited in the file of this patent

UNITED STATES PATENTS

| Number | Name | Date |
|---|---|---|
| 2,453,599 | Schlegel | Nov. 9, 1948 |
| 2,526,811 | Dawson | Oct. 24, 1950 |